United States Patent [19]

Nash

[11] 4,334,509

[45] Jun. 15, 1982

[54] ELECTRONIC IGNITION WITH STEP ADVANCE

[75] Inventor: Donald R. Nash, Berkey, Ohio

[73] Assignee: Eltra Corporation, Toledo, Ohio

[21] Appl. No.: 137,158

[22] Filed: Apr. 4, 1980

[51] Int. Cl.³ .............................................. F02P 5/04
[52] U.S. Cl. ................................... 123/414; 123/418; 123/615; 123/617
[58] Field of Search ............. 123/602, 612, 613, 614, 123/615, 616, 617, 619, 414, 418

[56] References Cited

U.S. PATENT DOCUMENTS

| | | | |
|---|---|---|---|
| 3,368,539 | 2/1968 | Kidwell | 123/613 |
| 3,626,455 | 12/1971 | Toda et al. | 123/418 X |
| 3,630,185 | 12/1971 | Struber et al. | 123/602 |
| 3,705,573 | 12/1972 | Palazzetti et al. | 123/414 |
| 3,800,757 | 4/1974 | Finch | 123/418 |
| 3,874,349 | 4/1975 | Fitzner | 123/602 |
| 3,937,200 | 2/1976 | Sleder et al. | 123/602 |
| 3,972,310 | 8/1976 | Gambill | 123/415 |
| 3,981,282 | 9/1976 | Ford | 123/416 |
| 3,985,109 | 10/1976 | Kondo et al. | 123/320 |
| 4,015,566 | 4/1977 | Wahl | 123/415 |
| 4,034,731 | 7/1977 | Sato | 123/599 |
| 4,036,190 | 7/1977 | Bigliani et al. | 123/416 |
| 4,054,113 | 10/1977 | Sleder et al. | 123/599 |
| 4,085,714 | 4/1978 | Hattori et al. | 123/427 |
| 4,095,576 | 6/1978 | Hattori et al. | 123/427 |
| 4,099,498 | 7/1978 | Sasaki | 123/418 |
| 4,100,895 | 7/1978 | Hattori et al. | 123/427 |
| 4,109,630 | 8/1978 | Richeson, Jr. et al. | 123/619 X |
| 4,111,174 | 9/1978 | Fitzner et al. | 123/602 |
| 4,119,076 | 10/1978 | Sato | 123/602 |
| 4,142,490 | 3/1979 | Hosaka et al. | 123/418 |

Primary Examiner—Tony M. Argenbright
Attorney, Agent, or Firm—James P. DeClercq

[57] ABSTRACT

A circuit for selecting between two or more detecting elements, such as magnetic pickups or resonant sensors (10, 12, 14) or (132, 134) spaced around a rotating member (15a, 157) to generate timing signals for an ignition system for an engine (15, 156) is disclosed. One disclosed embodiment is usable with a conventional mechanical advance to provide an additional advance above a predetermined vehicle (102) speed, and which may be negated by a vacuum switch (119) if the engine (156) is under heavy load. Another disclosed embodiment utilizes a plurality of such sensors (10, 12, 14) to provide a step-type ignition advance for an engine (15).

8 Claims, 2 Drawing Figures

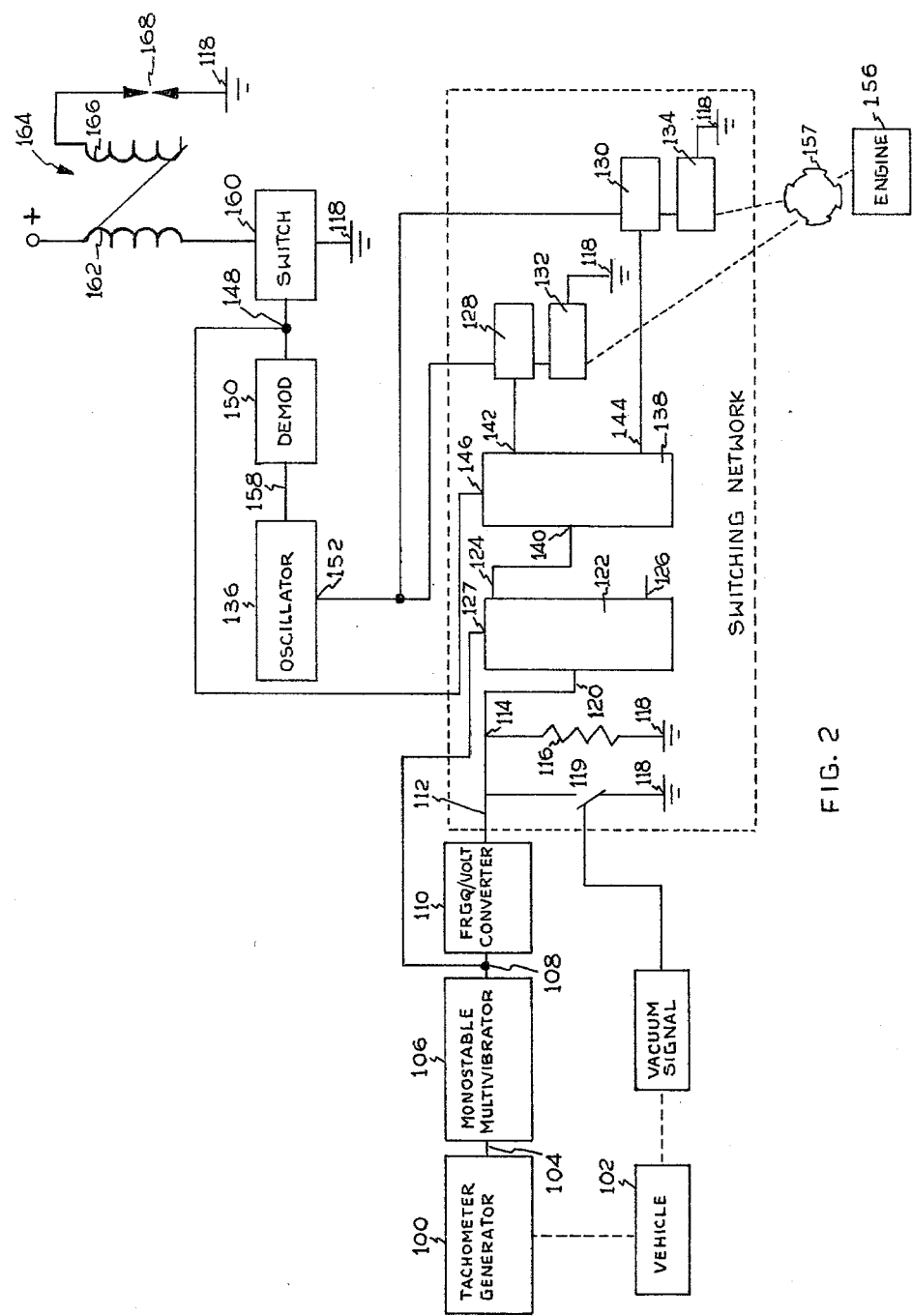

ELECTRONIC IGNITION WITH STEP ADVANCE

This invention relates to an electronic ignition system which provides a step advance. More particularly, the invention relates to an electronic ignition that provides a step-type spark advance by selecting among a plurality of separate sensing elements.

BACKGROUND OF THE INVENTION

It is often desirable to provide an ignition advance of some type for the ignition system of a spark-ignited internal combustion engine. For example, an engine speed increases, it is necessary to ignite the gasoline-air mixture sooner, since piston speed increases with engine speed, and it is desirable to have combustion well established by the time a piston of such an engine completes its compression stroke and begins its power stroke. Therefore, as engine speed is increased, additional time is allowed between the ignition of the mixture and transition of the piston from compression to power stroke, known as top-dead center (TDC). Conversely, for ease in starting an engine, it is desirable that there be no ignition of the mixture during the compression stroke to oppose piston motion, so an ignition pulse should be provided either very shortly before, or shortly after, a piston reaches top-dead-center when starting, and also when running at low speed. Such an engine may also be provided with a vacuum advance, sensing vacuum in the intake manifold of an engine as an approximation of the load opposed on a engine, with lowered manifold vacuum being indicative of increased engine load. Under this condition, an advanced ignition pulse should also be provided, so that the charge in the cylinder will be substantially fully ignited when it reaches top-dead center, to produce maximum power. In conventional automobiles and the like, ignition advance based on engine speed may be provided by a centrifugal weight and spring arrangement, operating pins or cams to rotate a plate on which an element, such as breaker points, in mounted, to sense the angular position of a rotating element of the engine. Advance based on vacuum may be accomplished by a vacuum diaphragm rotating a plate on which a centrifugal weight and spring assembly is mounted, so that the vacuum and speed advance mechanisms are additive. Alternatively, many ignition systems for such engines having an electronic, breakerless ignition system may provide an advance electronically, as a function of engine speed, while having a device without moving parts sensing angular position of a rotating element of the engine, mounted on a plate which is rotated by the vacuum diaphragm. In such a case, the vacuum and electronic advances are additive.

It is also desirable to provide an ignition advance for smaller engines, such as those that may be used in vehicles such as snowmobiles, all terrain vehicles, outboard motors for boats, motors for chain saws, and other such portable or mobile application. In the past, many such smaller motors have not been provided with an ignition advance, for the reason that they consume only a small amount of fuel, or do not require optimum power output or efficiency, or do not require frequent changes in engine speed. In such a case, ignition timing is selected at a compromised value, so that the engine will start relatively easily, and will run well at a particular speed, and operate adequately at other rotational speeds. Due to increased fuel costs, it is desirable for such engines to provide a rugged advance mechanism, not subject to contamination from an adverse environment, which can be constructed of components which will remain functional at elevated temperatures, and which are resistant to vibration encountered in such applications. Since engines used for mobile and portable uses must be light and compact, it is necessary to provide an ignition system which can be mounted on, or in close proximity to the heat and vibration environment found in such a location.

Also, in an engine for an automobile or the like, there are differing ignition advance requirements for control of pollution caused by engine exhaust, and for maximum engine efficiency. The products of the combustion process vary with the pressure at which it takes place, which are related partly to the temperature. It is known that combustion should be less complete, when a piston reaches its highest compression point, top-dead center, for minimum exhaust pollution, than for greatest efficiency or power output. It is desirable to have an ignition system which is adapted to minimize exhaust pollutants under some operating condition, and maximum efficiency fuel economy under other conditions. For instance, it may be thought desirable to minimize exhaust pollution, with a decreased efficiency, when a vehicle is operating at lower speed, in a city, and not when it is operating at higher speed. As in known, above approximately 40 miles per hour, the load imposed on the engine of a vehicle is predominantly composed on wind resistance, which increases in a non-linear manner with vehicle speed. It is also desirable to provide a vehicle with the smallest possible engine, reducing the weight of the vehicle, and reducing the amount of power needed to merely operate the engine in overcoming its internal inertia and frictions. Therefore, to achieve adequate power output for highway operations of such a vehicle, it may be found desirable to provide a slight increase in ignition advance at higher engine speeds, so that a small engine will be capable of operating a car at highway speeds, with maximum efficiency and minimum usage of fuel.

SUMMARY OF THE INVENTION

It is an object of the present invention to provide a step-type advance, which can be made cumulative with that advance caused by conventional advance mechanism, or which may be used to provide an ignition advance on engines where this has not been practical.

It is a further object of the invention to provide the step-type advance by selecting from among a plurality of sensing devices angularly spaced around a rotating member.

It is a further object of the invention to provide such an ignition advance means which may be mounted in close proximity to an engine.

BRIEF DESCRIPTION OF THE DRAWINGS

FIG. 2 shows a second embodiment of the invention, illustrating means for selecting between at least two sensors for providing an additional spark advance, adapted to be used with an engine which incorporates another form of spark advance.

DETAILED DESCRIPTION OF THE INVENTION

Figure 1:
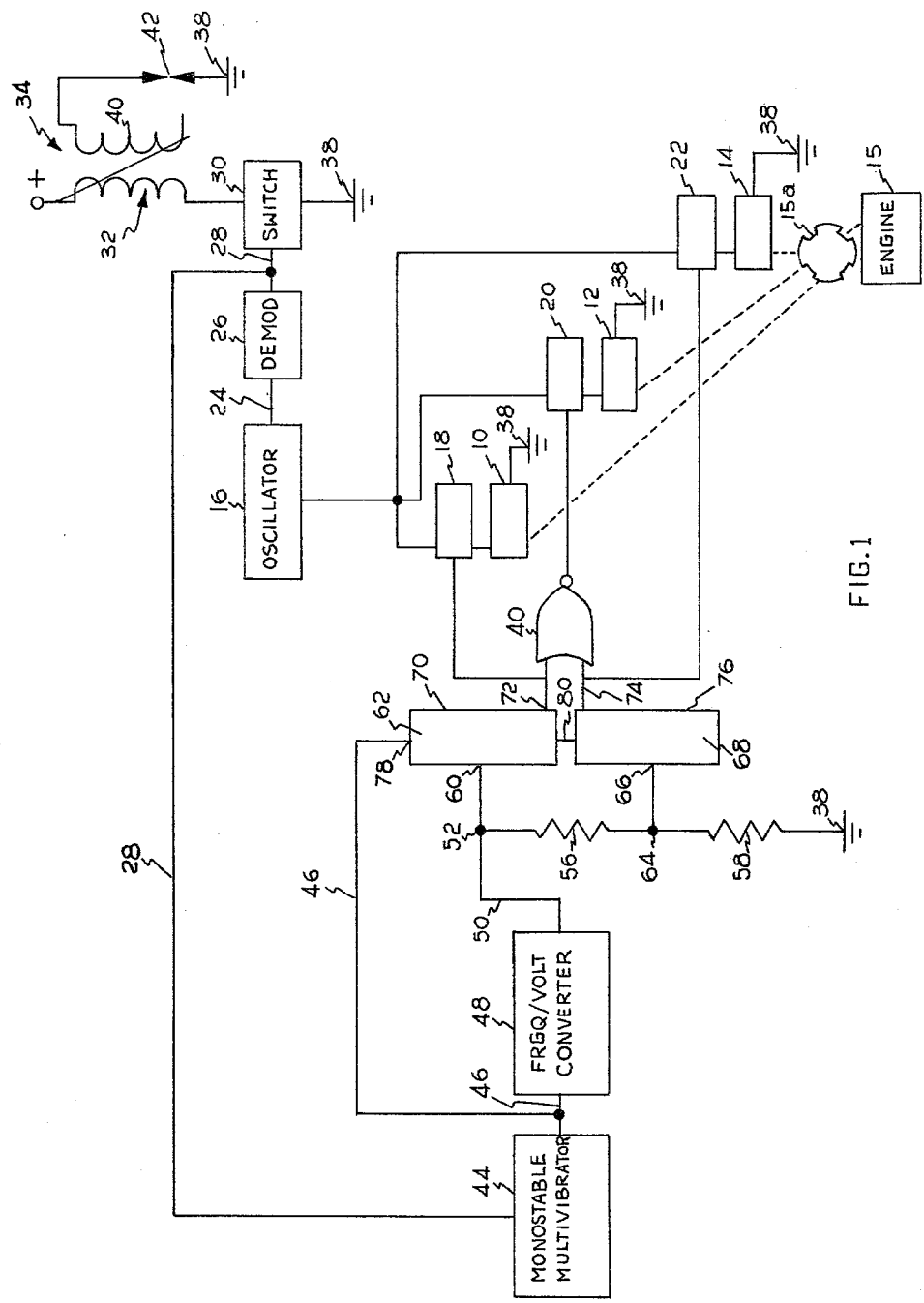
FIG. 1 shows a schematic diagram of a first embodiment of the invention illustrating means for selecting between a plurality of sensors, adapted for use in an engine with or without other forms of spark advance.

Referring to FIG. 1, there is shown a first embodiment of the invention usable to provide a multiple-step spark advance based on engine speed. A sensor 10, 12, or 14, is disposed adjacent to a rotating component 15a of an engine 15 to detect the rotational position of the engine 15. The frequency of detection of this rotating part of the engine is a measure of engine speed. In the preferred embodiment of the engine, the proximity of a conductive rotating portion of the engine to a sensor affects the amplitude of oscillation of oscillator 16. It will be obvious that a functional system may also be based around an oscillator whose frequency changes with the proximity of a rotating conductive portion of an engine, or with a bridge-type detecting network producing an analog change in voltage with proximity of the rotating conductive portion, or that an opto-electric or Hall-effect sensor could be used, with an amplifier or the like in place of an oscillator and demodulator as described below.

In the preferred embodiment of the invention, oscillator 16 is of the starved-feedback type, where the amplitude of oscillation of oscillator 16 decreases to a preset level as a rotating conductive portion of the engine comes into proximity with a sensor 10, 12 or 14. Switches 18, 20, and 22 are interposed between oscillator 16 and sensors 10, 12, and 14, to select one of the sensors. It will be apparent that sensors 10, 12, and 14 are spaced about the rotating conductive portion 15a of the engine 15 to provide a signal at different rotational positions of the engine, to provide a step-type spark advance. In the preferred embodiment, sensors 10, 12, and 14 are inductive coils, forming the resonant circuit of oscillator 16, proximity of a conductor to the sensor causing a decrease in its Q, resulting in a decrease in amplitude of oscillation of oscillator 16. Oscillator 16 has an output 24 connected to demodulator 26. Demodulator 26 accepts the two-level oscillation amplitude of oscillator 16, and converts it to two-level DC signal. In the preferred embodiment, demodulator 26 includes a detector circuit, rectifying the oscillating output of oscillator 16, and a Schmitt trigger circuit for providing hysteresis, so that slow changes in amplitude of the oscillation of oscillator 16 as a conductive portion approaches and departs from the proximity of sensors 10, 12, and 14 do not result in false ignition signals. Output 28 of demodulator 26 is applied to switch 30, which is connected in series with the primary 32 of an ignition coil 34. In operation, current flows from positive terminal 36, through ignition coil primary 32 and switch 30, to ground 38. Upon actuation of switch 30, this path is interrupted, flux in coil 43 collapsing, and inducing a voltage in secondary winding 40 of ignition coil 32, creating an ignition pulse across spark gap 42. Spark gap 42 may be a spark plug or the like, and a distributor may be interposed between ignition coil 32 and several spark gaps 42 for use with a multiple-cylinder engine. Obviously, a plurality of separate conductive portions may be provided on the rotating portion of the engine, in a number appropriate for the number of cylinders of the engine to be operated.

As will be apparent, the output 28 of demodulator 26 has a frequency proportional to the speed of an engine. In the preferred embodiment of the invention, this signal is converted to an analog DC signal by monostable multivibrator 30 and frequency to voltage convertor 32. Monstable multivibrator 30 produces an output 34 having a constant amplitude, and constant duty cycle, and a frequency equal to the frequency of output 28 of demodulator 26, which is proportional to engine speed. Output 43 of monstable multivibrator 30 is applied to frequency to voltage convertor 32. Convertor 32 may be any conventional frequency-to-voltage convertor, including a simple resistor-capacitor integrating circuit. Convertor 32 produces a output 50, which is applied to a point 52 of a voltage divider composed of resistors 56 and 58 connected in series between point 52 and ground 38, and also to an input 60 of a logic element 62. The junction 64 of resistors 56 and 58 is connected to an input 66 of a logic element 68. Logic element 62 has complimentary outputs 70 and 72. Logic element 68 has complimentary outputs 74 and 76. The output 46 of monstable multivibrator 44 is connected to a clock input 78 of logic element 62, and a clock input 80 of logic element 68.

If voltage at input 60 of logic element 62 is above the threshold of input 60, at the time a voltage appears at clock input 78, the output 70 will assume a high value, while complimentary output 72 will assume a low value. Logic element 68 is identical to logic element 62, having input 66, complimentary outputs 74 and 76, and a clock input 80. Again, if voltage at input 66 is above the threshold when a voltage appears at clock input 80, a high level will appear at output 74 and a low level will appear at complimentary output 76. Conversely, if the voltage present at input 60 or 66 is below the threshold, output 70 or 74 will become a low value, and outputs 72 or 76 will become a high value. Therefore, as engine speed increases, the voltage at point 52 will slowly increase, until the voltage at input 60 reaches a threshold. As engine speed continues to increase, voltage at point 64, connected to input 66, will increase, until the threshold of logic element 68 is reached. It will be apparent that the number of sensors which can be selected by such a circuit is related to the number of logic elements such as 62 or 66, and that additional logic elements such as 62, and 68, and appropriate voltage dividing resistors such as resistors 56 and 58, may be added to construct a system according to the invention capable of selecting among a greater number of sensors such as 10, 12 and 14.

In the embodiment illustrated, a high level appearing at output 72 of logic element 62 energizes switch 18, connecting sensor 10 to oscillator 16, providing an unadvanced ignition signal. As engine speed increases, the voltage at input 60 of logic element 62 will reach a threshold, and output 72 will become a low valve. The voltage at input 66 of logic element 68 will not yet have reached a threshold, so that output 74 is a low value. Outputs 72 and 74 are applied to a logic gate 80, which produces an output 82 which is a high level when outputs 72 and 74 are at a low level, actuating switch 20 and connecting sensor 12 to oscillator 16, for producing an ignition pulse having a first predetermined advance. As engine speed continues to increase, the voltage at point 52 will continue to increase until the voltage at point 64, connected to input 66 of logic element, reaches a threshold. At this time, output 74 will become a high level, while output 76 becomes a low level. Output 74 is connected to switch 22, which becomes conductive in response to a high voltage level, connecting sensor 14 to oscillator 16, producing an ignition pulse with a second predetermined advance.

In the preferred embodiment, switches 18, 20 and 22 are transistors in series between input 84 of oscillator 16 and sensors 10, 12 and 14, respectively. In the preferred embodiment of FIG. 1, sensors 10, 12 and 14 are inductors forming the resonant circuit of oscillator 16, with flux losses caused by proximity to a conductor, resulting in a lower Q for the sensor, and lower amplitude of oscillation of oscillator 16. Sensors 10, 12 and 14 are connected between switches 18, 20, and 22, respectively, and ground 38. The embodiment shown in FIG. 1 is preferably used to provide a stepped ignition advance for an internal combustion engine not otherwise provided with an ignition advance. As will be apparent from inspection of FIG. 2, switch means may also be connected to points 52 or junction 66 for forcing the selection of a predetermined one of sensors 10, 12 and 14 responsive to an engine or vehicle parameter, or an additive to an engine or vehicle parameter, or an additive or subtractive voltage may be introduced at point 52 or junction 66 for varying the speeds at which sensors 10, 12 and 14 are selected in response to an engine or vehicle parameter.

Referring now to FIG. 2, there is illustrated a system for providing an ignition advance based on an indication of engine speed independent from that attainable through sensors sensing engine speed directly. In the preferred embodiment, a tachometer generator 100 is connected to the drive shaft of a vehicle 102 to produce an intermittent or alternating current signal output 104 proportional to vehicle speed, and also proportional to engine speed. Output 104 is applied to monstable multivibrator 106, in turn producing an output 108 which has constant amplitude and duty cycle, and a frequency proportional to vehicle speed. Output 108 is applied to frequency-to-voltage convertor 110, producing a DC voltage output 112. Output 112 is applied to a terminal 114 of resistor 116 connected between terminal 114 and ground 118, and to a switch means 119, responsive to a vehicle parameter, such as engine manifold vacuum. Resistor 116 and the output impedance of convertor 110 form a voltage divider, with terminal 114 being equivalent to the center tap of a two-element voltage divider. Terminal 114 is connected to input 120 of a logic element 122. Logic element 122 has complimentary outputs 124 and 126, and a clock input 127 connected to output 108 of monostable multivibrator 106. At a low vehicle speed, the voltage at input 120 will be below a threshold, so output 124 will be in a low voltage state, and output 126 will be in a high voltage state. As vehicle speed increases, the voltage at point 120 increases, and output 124 becomes a high voltage state, while output 126 becomes a low voltage state. Although output 124 and 126 could be directly connected to switches 128 and 130, to select between sensors 132 and 134 to be connected to oscillator 136, it is not desirable that sensors be interchanged close to the time that an ignition pulse is produced, since uneven timing between cylinders of an engine could be produced. Therefore, a logic element 138, identical to logic element 122, is interposed. An input 140 of logic element 138 is connected to output 124. Logic element 138 has outputs 142 and 144, connected to switches 128 and 130, respectively. The clock input 146 of logic element 138 is connected to an output 148 of demodulator 150, to synchronize the operation of switches 128 and 130 with intervals between firing pulses. As shown, outputs 142 and 144 of logic element 138 follow output 124 and 126 of logic element 120, at an appropriate time. If the possibility of uneven timing between cylinders is not of concern in a particular application, logic element 138 may be deleted.

So, as vehicle speed rises, the voltage at output 112, and input 120 of logic element 122, rises a corresponding amount. At low vehicle speeds, sensor 132 is selected. As vehicle speed reaches a predetermined rate, sensor 134 is selected, unless switch means 119 is conductive, forcing input 120 to a low voltage level, forcing the selection of sensor 128. In the preferred embodiment of FIG. 2, sensors 128 and 134 are mounted on a conventional mechanical advance mechanism, for providing a normally-advancing ignition signal, and for providing an additional advance for most efficient operation above a set vehicle speed, unless engine vacuum or another load-responsive engine parameter indicates that the vehicle engine may be adversely affected by additional ignition advance.

As in FIG. 1, sensors 132 and 134 are preferably, but not necessarily, inductors connected between an input 152 of oscillator 136 and ground 118 through switches 128 and 130, respectively, to decrease the amplitude of oscillation of oscillator 136 when sensor 132 or 134 is in proximity to a conductive rotating part 157 of an engine 156. The oscillation of oscillator 136 appears at output 158, and is processed by a demodulator 150 into a switching output 148, which is connected to switch 160, connected between the primary 162 of an ignition coil 164 and ground 156. In operation, current flows through primary 162 of coil 164 until interrupted by switch 160, at which time the magnetic field in coil 164 collapses, inducing a voltage in secondary winding 166, and causing a spark discharge across gap 168, which may be a gap of conventional spark plug. As above, a distributor may be interposed between coil 164 and spark gap, or gaps 168.

Logic elements 62, 68, 122 and 138 are, in the preferred embodiments, conventional D-type flip-flops, and logic gate 80 is a conventional NOR gate.

As will be apparent, numerous modifications and variations of the invention described above will be obvious to one skilled in the art, and may be made without departing from the spirit and scope of the invention.

I claim:

1. An ignition system for an internal combustion engine, comprising:
   a plurality of sensor means responsive to a predetermined rotational position of said engine;
   oscillator means;
   first switch means interposed between said oscillator means and each of said plurality of sensor means for selecting one said sensor means;
   said oscillator means being responsive to said selected one sensor means;
   demodulator means responsive to said oscillator means for producing a switching signal;
   second switching means responsive to said switching signal for causing an ignition coil to produce an ignition pulse;
   converter means for producing a voltage proportional to a frequency produced by said oscillator means in response to said selected sensor means, said frequency being proportional to rotational speed of said engine;
   voltage divider means electrically connected to said converter means;
   at least one logic means having an input and complimentary outputs, said input having a threshold, said complimentary outputs being responsive to a voltage above and below said threshold;
said voltage divider means being connected to said input and providing said voltage to said input; and
logic gate means for selecting and controlling one of said first switch means in response to said outputs of said logic means.

2. An ignition system for an internal combustion engine, comprising:
a pluraltiy of sensor means responsive to a predetermined rotational position of said engine;
oscillator means;
first switch means interposed between said oscillator means and each of said sensor means for selecting one said sensor means;
tachometer means operatively connected to said engine and responsive to the rotation of said engine for providing a first time-varying signal;
means responsive to said time-varying signal for producing a substantially constant duty cycle signal;
converter means responsive to said constant duty cycle signal for producing a voltage substantially proportional to the frequency of said time-varying signal, said time-varying signal having a frequency proportional to the rate of rotation of said engine;
at least one logic means having complimentary outputs and an input having a threshold responsive to said voltage;
said logic means being operatively coupled to said first switch means for selecting one said sensor means;
said oscillator means producing an oscillation having a characteristic responsive to said sensor means;
demodulator means operatively connected to said oscillator means for producing a switching signal; and
second switching means responsive to said switching signal, said second switching means being operatively connected to an ignition coil means for producing an ignition pulse.

3. An ignition system for an internal combustion engine comprising:
a plurality of sensor means responsive to rotational position of said engine;
means operatively connected to one of said sensor means for producing a time-varying signal having a frequency proportional to rotational speed of said engine;
means for converting one of said time-varying signals to a voltage signal substantially proportional to said rotational speed;
means responsive to said voltage signal for selecting one of said sensors;
means responsive to a vehicle parameter for selecting a predetermined one of said sensors for producing a predetermined ignition advance dependent only on said vehicle parameter, said internal combustion engine being incorporated into a vehicle;
said means for converting including means responsive to said time-varying signal for producing a substantially-constant duty cycle signal and means for transforming said substantially-constant duty cycle signal to said voltage signal substantially proportional to said rotational speed;
said means for selecting including logic means having complementary outputs and an input having a threshold;
said means responsive to said time-varying signal including oscillator means, demodulator means, and switching means;
said oscillator means producing an oscillating signal having an amplitude responsive to said sensor means;
said demodulator means including detector means and threshold hysteresis switching means responsive to said amplitude of said oscillating signals;
said switching means being responsive to said threshold hysteresis switching means;
said switching means being operably connected to an ignition coil means for producing an ignition pulse;
whereby selecting among said sensor means produces step-type ignition advance.

4. An ignition system for an internal combustion engine comprising:
a plurality of sensor means responsive to rotational position of said engine;
means operatively connected to one of said sensor means for producing a time-varying signal having a frequency proportional to rotational speed of said engine;
means for converting one of said time-varying signals to a voltage signal substantially proportional to said rotational speed;
means responsive to said voltage signal for selecting one of said sensors;
means responsive to a vehicle parameter for selecting a predetermined one of said sensors for producing a predetermined ignition advance dependent on said vehicle parameter, said internal combustion engine being incorporated in a vehicle;
said means for converting including means responsive to said time-varying signal for producing a substantially-constant duty cycle signal and means for transforming said substantially-constant duty cycle signal to said voltage signal substantially proportional to said rotational speed;
said means for selecting including logic means having complementary outputs and an input having a threshold;
said means responsive to said time-varying signal including oscillator means, demodulator means and switching means;
said oscillator means producing an oscillating signal having a characteristic responsive to said sensor means;
said demodulator means including detector means and threshold hysteresis switching means responsive to said characteristic of said oscillating signal;
said switching means being responsive to said threshold hysteresis switching means;
said switching means being operably connected to an ignition coil means for producing an ignition pulse;
whereby selecting among said sensor means produces a step-type ignition advance.

5. An ignition system for an internal combustion engine comprising:
a plurality of sensor means responsive to rotational position of said engine;
means operatively connected to one of said sensor means for producing a time-varying signal having a frequency proportional to rotational speed of said engine;
means for converting one of said time-varying signals to a voltage signal substantially proportional to said rotational speed;

means responsive to said voltage signal for selecting one of said sensors;

means responsive to a vehicle parameter for selecting a predetermined one of said sensors for producing a predetermined ignition advance dependent only on said vehicle parameter, said internal combustion engine being incorporated into a vehicle;

said means for converting including means responsive to said time-varying signal for producing a substantially-constant duty cycle signal and means for transforming said substantially-constant duty cycle signal to said voltage signal substantially proportional to said rotational speed;

said means for selecting including logic means having complementary outputs and an input having a threshold;

said means for selecting including logic gate means operatively connected to said logic means and responsive thereto;

said means responsive to said time-varying signal including oscillator means, demodulator means and switching means;

said oscillator means producing an oscillating signal having a characteristic responsive to said sensor means;

said demodulator means including detector means and threshold hysteresis switching means responsive to said characteristic of said oscillating signal;

said switching means being responsive to said threshold hysteresis switching means;

said switching means being operatively connected to an ignition coil means for producing an ignition pulse;

whereby selecting among said sensor means produces a step-type ignition advance.

6. An ignition system for an internal combustion engine comprising:

a plurality of sensor means responsive to rotational position of said engine;

means operatively connected to one of said sensor means for producing a time-varying signal having a frequency proportional to rotational speed of said engine;

means for converting one of said time-varying signals to a voltage signal substantially proportional to said rotational speed;

means responsive to said voltage signal for selecting one of said sensors;

means responsive to said time-varying signal for providing an ignition pulse to said engine;

said means for converting including means responsive to said time-varying signal for producing a substantially-constant duty cycle signal and means for transforming said substantially-constant duty cycle signal to said voltage signal substantially proportional to said rotational speed;

said means for selecting including logic means having complementary outputs and an input having a threshold;

said means for selecting including logic gate means operatively connected to said logic means and responsive thereto;

said means responsive to said time-varying signal including oscillator means, demodulator means and switching means;

said oscillator means producing an oscillating signal having a characteristic responsive to said sensor means;

said demodulator means including detector means and threshold hysteresis switching means responsive to said characteristic of said oscillating signal;

said switching means being responsive to said threshold hysteresis switching means;

said switching means being operably connected to an ignition coil means for producing an ignition pulse;

whereby selecting among said sensor means produces a step-type ignition advance.

7. An ignition system for a vehicle including an internal combustion engine having a mechanical ignition advance means comprising:

a plurality of sensor means responsive to rotational position of said engine and operatively connected to said mechanical ignition advance means;

first means operatively connected to one of said sensor means for producing a time-varying signal having a frequency proportional to rotational speed of said engine, and for producing an ignition pulse responsive to said time-varying signal;

second means responsive to a first parameter of said vehicle;

converter means operatively connected to said second means for producing a voltage signal substantially proportional to said first parameter;

means responsive to said voltage signal for selecting one of said sensor means;

said converter means including means responsive to said second means for producing a substantially-constant duty cycle signal and means for transforming said substantially-constant duty cycle signal to said voltage signal substantially proportional to said first parameter;

said means for selecting including logic means having complementary outputs and an input having a threshold;

said first means including oscillator means, demodulator means, and switching means;

said oscillator means producing an oscillating signal having a characteristic responsive to said sensor means;

said demodulator means including detector means and threshold hysteresis switching means responsive to said characteristics;

said switching means being responsive to said threshold hysteresis switching means;

said switching means being operably connected to an ignition coil for producing an ignition pulse;

whereby selecting one of said sensor means provides an ignition advance for said engine responsive to both said mechanical ignition advance and to said selected sensor means.

8. An ignition system for a vehicle including an internal combustion engine having a mechanical ignition advance means comprising:

a plurality of sensor means responsive to rotational position of said engine and operably connected to said mechanical ignition advance means;

first means operatively connected to one of said sensor means for producing a time-varying signal having a frequency proportional to rotational speed of said engine, and for producing an ignition pulse responsive to said time-varying signal;

second means responsive to a first parameter of said vehicle;

converter means operably connected to said second means for producing a voltage signal substantially proportional to said first parameter;

means responsive to said voltage signal for selecting one of said sensor means;

third means responsive to parameter of said engine for selecting a predetermined one of said plurality of sensor means in response to said parameter of said engine;

said converter means including means responsive to said second means for producing a substantially-constant duty cycle and means for transforming said substantially-constant duty cycle to said voltage signal substantially proportional to said first parameter;

said first means including oscillator means, demodulator means and switching means;

said means for selecting includes logic means having complementary outputs and an input having a threshold;

said oscillator means producing an oscillating signal having a characteristic responsive to said sensor means;

said demodulator means including detector means and threshold hysteresis switching means responsive to said characteristic;

said switching means being responsive to said threshold hysteresis switching means;

said switching means being operably connected to an ignition coil for producing an ignition pulse;

whereby selecting among said sensor means produces a step-type ignition advance.

* * * * *

UNITED STATES PATENT AND TRADEMARK OFFICE
CERTIFICATE OF CORRECTION

PATENT NO. : 4,334,509

DATED : June 15, 1982

INVENTOR(S) : Donald R. Nash

It is certified that error appears in the above-identified patent and that said Letters Patent are hereby corrected as shown below:

```
Column 1, line 13, change "an" to --as--;
          line 27, delete the hyphen between "dead" and
"center";
          line 31, change "a" to --an--;
          line 41, change "in" to --is--;
          line 58, change "application" to --applications--.
Column 2, line 26, change "in" to --is--;
          line 29, change "on" to --of--;
          line 46, before "conventional" insert --a--.
Column 4, line 1, change "Monstable" to --Monostable--;
          line 5, change "monstable" to --monostable--;
          line 9, change "a" to --an--;
          line 17, change "monstable" to --monostable--;
          line 51, change "valve" to --value--;
          line 61, after "element" insert --68--.
Column 5, line 31, change "monstable" to --monostable--.
Column 6, line 33, before "conventional" insert --a--.
```

Signed and Sealed this

Second Day of November 1982

[SEAL]

Attest:

GERALD J. MOSSINGHOFF

*Attesting Officer*     *Commissioner of Patents and Trademarks*